United States Patent [19]

Gnerlich et al.

[11] Patent Number: 5,891,231
[45] Date of Patent: Apr. 6, 1999

[54] PROCESS FOR PREPARING PIGMENT DISPERSIONS USED IN INKS

[75] Inventors: Robin Gant Gnerlich, Lexington; Anna Marie Pearson, Richmond; Ashok Vishnu Gangal, Lexington, all of Ky.

[73] Assignee: Lexmark International Inc., Lexington, Ky.

[21] Appl. No.: 855,413

[22] Filed: May 13, 1997

[51] Int. Cl.$^6$ .................................................. C09D 11/10
[52] U.S. Cl. .................. 106/31.86; 106/31.6; 106/31.85; 523/160; 523/161
[58] Field of Search ................................ 106/31.6, 31.86; 523/161

[56] References Cited

U.S. PATENT DOCUMENTS

| | | | |
|---|---|---|---|
| 3,844,994 | 10/1974 | Vijayendran | 260/22 R |
| 4,038,241 | 7/1977 | Inman et al. | 260/39 P |
| 4,098,793 | 7/1978 | Ribaldone et al. | 260/303 |
| 4,421,601 | 12/1983 | Stephan et al. | 162/162 |
| 4,469,826 | 9/1984 | Carlick et al. | 523/339 |
| 4,855,344 | 8/1989 | Nealy et al. | 524/86 |
| 4,883,714 | 11/1989 | Stockl et al. | 428/412 |
| 5,039,339 | 8/1991 | Phan et al. | 428/481 |
| 5,041,489 | 8/1991 | Coney et al. | 524/389 |
| 5,129,947 | 7/1992 | Sharma et al. | 106/20 |
| 5,158,606 | 10/1992 | Carlick et al. | 524/145 |
| 5,264,034 | 11/1993 | Dietz et al. | 106/493 |
| 5,554,217 | 9/1996 | Bäbler | 106/494 |
| 5,651,813 | 7/1997 | Santilli et al. | 106/31.67 |

OTHER PUBLICATIONS

Grinding Media, Mar., 1997, S.E. Firestone Associates, Inc., Melrose Park, PA.

*Primary Examiner*—Tae Yoon
*Attorney, Agent, or Firm*—John M Romary

[57] ABSTRACT

A method for making a dispersion for an ink, and the ink obtained from this method. The method comprises preparing a dispersion comprising colorant agglomerates and reducing the agglomerate size using a plastic medium. The dispersion is formed by dispersing the colorant agglomerates in a dispersant, optionally in the presence of a liquid carrier such as distilled or deionized water. The colorant in the dispersion may be a carbon black, yellow, cyan, or magenta pigment, or a combination thereof. The plastic medium is preferably a grinding medium, such as polystyrene.

15 Claims, No Drawings

PROCESS FOR PREPARING PIGMENT DISPERSIONS USED IN INKS

FIELD OF THE INVENTION

This invention is directed to an improved method for making an ink. Specifically, it is directed to an improved method for preparing colorant dispersions that may be employed in ink compositions.

BACKGROUND OF THE INVENTION

Conventionally, inks comprise colorants such as pigment or dye compounds. Pigment based inks, for example, are typically prepared by dispersing pigment agglomerates, formed when individual pigment particles cluster together, in a dispersant. The size of the pigment agglomerates may be reduced by grinding the pigment dispersion using conventional grinding media such as glass, stainless steel, or zirconium oxide.

When preparing pigment dispersions for use in ink-jet inks, for example, conventional grinding media have been found to be unacceptable because they either alter (usually by increasing) the pH of the dispersion to an unacceptable level or result in contamination of the dispersion. An unacceptably high pH can result in inks having incompatibility with ink processing and printing equipment. Contamination can result in, for example, discoloration of inks prepared from the above-described pigment dispersions.

This invention is based on the discovery that plastic media for grinding colorant dispersions, while satisfactorily reducing the colorant agglomerate size in the pigment dispersion, do not unacceptably alter the pH or unduly contaminate the dispersion. Moreover, using plastic media, as described herein, unexpectedly results in an ink composition having a superior color gamut.

DESCRIPTION OF THE RELATED ART

An ink is generally a mixture of colorants dispersed or dissolved in a vehicle or carrier to form a fluid or paste that can be printed on a substrate and dried. The colorants used are generally pigments, lakes, dyes, or combinations of these materials. A vehicle acts as a carrier for the colorants during the printing operation, and in most cases, serves to bind the colorants to the substrate. Inks may be applied in thin films on many substrates, such as paper, paperboard, metal sheets, metallic foil, plastic films, molded plastic articles, textiles, and glass.

U.S. Pat. Nos. 5,158,606 and 4,038,241 disclose that inks may contain polystyrene as a component, such as a pigment emulsifier. However, these references incorporate the polystyrene as a component in the ink, rather than using the polystyrene as a grinding medium.

U.S. Pat. No. 5,158,606 discloses that rub-off resistant printing inks may be formed by dispersing a pigment in a vehicle and emulsifying a polymer latex therein.

OBJECTS OF THE INVENTION

One object of our discovery is a method for making a dispersion for an ink by preparing a dispersion comprising colorant agglomerate and reducing the agglomerate size by using a grinding medium which does not substantially physically degrade or chemically interact with the dispersion, and does result in an improved ink color gamut.

Another object is a method for making a dispersion for an ink where a grinding medium reduces the agglomerate size of colorants in the dispersion while substantially eliminating the contamination, unacceptable discoloration, and premature sedimentation of, for example, the colorant in the ink.

Another object is a method for making a dispersion for an ink where a grinding medium reduces the agglomerate size of colorants in the dispersion while not unacceptably altering the pH of the dispersion or ink prepared therefrom.

It should be noted herein that colorant is defined to mean any group which requires dispersing with a dispersant in order to produce an ink when placed in a liquid vehicle. Such a colorant can include, therefore, insoluble dyes and preferably pigments.

SUMMARY OF THE INVENTION

To achieve these and other advantages, and in accordance with the purpose of our discovery as embodied and broadly described herein, in one aspect we describe a method for making a dispersion for an ink by mixing a dispersant and a colorant having agglomerates of an initial size and reducing the initial colorant agglomerate size using a plastic medium. Preferably, the dispersion is formed by dispersing the colorant agglomerates in the dispersant, optionally in the presence of a liquid carrier such as distilled or deionized water. The colorant, for example, may be any color in the dispersion including a color generated from a yellow, cyan, carbon black or magenta pigment, or a combination thereof. The plastic medium is preferably a grinding medium having a bulk density of less than about 1.45 kg/l and preferably less than about 1.00 kg/l and most preferably less than about 0.75 kg/l, including all ranges subsumed therein. Such a plastic medium includes, for example, a medium having a styrene, carbonate, amide, ester or urethane derived backbone, including copolymers and blends prepared therefrom. The plastic medium is preferably a shape and size that reduces the agglomerate size of the colorant.

This invention also relates to a dispersion obtained by the disclosed methods, as well as an ink comprising such a dispersion.

Both the foregoing general description and the following detailed description are exemplary and explanatory only, and do not restrict the invention as claimed.

DETAILED DESCRIPTION OF THE INVENTION

Forming an ink may, for example, occur in two steps: forming a colorant (such as a pigment) dispersion and then incorporating the colorant dispersion in a liquid to form the ink. Furthermore, forming a colorant dispersion may, for example, occur in three stages: wetting, grinding, and dispersing, although these stages may overlap and generally are not limited to any order.

The wetting stage generally displaces gases or other contaminants that have been adsorbed on the surface of the colorant agglomerates, followed by attaching a wetting vehicle to the colorant surface. To enhance the wetting process, fresh colorant surfaces are preferably exposed to the wetting vehicle by mechanically separating aggregates (agglomerates of reduced size) and colorant particles which make up the agglomerates prior to grinding.

The grinding process, which is another stage, reduces the size of the colorant agglomerates. Colorant aggregates and particles often agglomerate into relatively soft packed clusters. Grinding reduces the colorant agglomerate size and separates the agglomerates into at least one member selected from the group consisting of isolated aggregates and particles, thereby exposing more colorant surface area. As the colorant surface area available for wetting increases, the colorant aggregates and particles are better dispersed into the wetting vehicle and a better colorant dispersion results.

The grinding process continues until the desired agglomerate (aggregate or particle) size is obtained, which depends on several parameters, such as the desired use of the dispersion, type of ink in which the dispersion is incorporated, type of milling equipment and media used, and desired throughput and retention time in the milling equipment. In the instant invention, the mean agglomerate size is preferably reduced so that the resulting aggregates and/or particles after grinding have a size of less than about 500 nm and preferably less than about 300 nm and most preferably less than about 200 nm, including all ranges subsumed therein.

In the dispersion stage, the wetted aggregates and particles disperse throughout a liquid vehicle to effect a separation of the individual particles or remaining aggregates. Each particle or aggregate is surrounded with sufficient dispersant so that contact between particles and/or aggregates is minimized. If the particles or aggregates cluster again (forming an agglomerate) in the liquid vehicle, the effect is called flocculation or agglomeration, which can cause processing or printing equipment problems.

In the instant invention, the colorant, which is preferably a pigment, may be an inorganic or organic pigment well known in the art. There is no limitation with respect to the pigments that may be employed in this invention other than that they are capable of resulting in an ink. Any of the commonly employed organic or inorganic pigments may be used. An illustrative list of the pigments which may be employed in this invention includes azo pigments such as condensed and chelate azo pigments; polycyclic pigments such as phthalocyanines, anthraquinones, quinacridones, thioindigoids, isoindolinones, quinophthalones. Still other pigments which may be employed include, for example, nitro pigments, daylight fluorescent pigments, carbonates, chromates, titanium oxides, zinc oxides, iron oxides and carbon black. Such pigments may be prepared via conventional techniques and many are commercially available. Preferably, the colorant is a pigment and may be any carbon black, yellow, cyan, magenta, red, green or orange pigment, or any combination thereof. More preferably, the pigment is Pigment Yellow 74, Pigment Blue 15:4, or Pigment Red 122.

Conventionally, a dispersant may act as both the wetting vehicle and the vehicle which stabilizes the particles and/or aggregates. There is essentially no limitation with respect to the dispersants which may be employed in this invention. In fact, any non-polymeric or polymeric dispersant which may be used to make a pigment based ink composition may be employed in this invention. The often preferred dispersants are polymeric dispersants. An illustrative list of such polymeric dispersants includes random, block and branched polymers, whereby the polymers may be anionic, cationic or nonionic in nature. The polymeric dispersants typically have hydrophilic segments for aqueous solubility and hydrophobic segments for pigment interaction. Moreover, polymeric dispersants as used herein are meant to include homopolymers, copolymers (including terpolymers), immiscible blends and miscible blends.

Since the polymeric dispersants in this invention generally are limited only to the extent that they are capable of dispersing a colorant in an ink composition, the precursor units which may be used to make such polymeric dispersants are not limited. Precursor, as used herein, is meant to include monomeric and macromeric units.

A general list of the monomeric units which may be employed to make such polymeric dispersants include, for example, acrylic monomers, styrene monomers and monomers having amine groups. Illustrative examples of the monomers which may be employed include acrylic and methacrylic acid, acrylamide and methacrylamide.

The polymeric dispersants often employed tend to be any of those which are commercially available as well as the polymeric dispersants which may be made via conventional techniques which include, for instance, condensation and addition polymerizations such as anionic, group transfer or free radical polymerizations of monomeric units.

The often preferred polymeric dispersants which may be employed in this invention are random terpolymers prepared from three precursors. The most preferred precursors include monomeric and macromeric precursors, including at least one member selected from the group consisting of acrylates and methacrylates, at least one member selected from the group consisting of acryloyl- and methacryloyl-terminated polydiakylsiloxanes and at least one member selected from the group consisting of stearyl acrylate, stearyl methacrylate, and lauryl methacrylate. Particularly the preferred polymeric dispersant is herein referred to as Lexmark™ acrylic terpolymer and is made from polymerizing methacrylic acid, stearyl methacrylate, and dimethylsiloxane.

The polymeric dispersants prepared from these particularly preferred precursors may be made by polymerizing the monomeric and macromeric precursors via art recognized techniques which include free radical polymerizations. A more detailed description of the most preferred polymeric dispersants which may be employed in this invention may be found in U.S. Pat. Nos. 5,714,538 and 5,719,204, the disclosures of which are incorporated herein by reference.

To aid our dispersion process, an optional liquid carrier may be added to the colorant and dispersant. The optional liquid carrier dilutes and modifies the viscosity of the pigment dispersion. The liquid carrier must be compatible with the selected colorant and selected dispersant. Suitable liquid carriers include those that operate within these parameters, such as water, toluene, isopropyl alcohol, soybean oil, rapeseed oil, tung oil, mineral oil and mixtures thereof. Preferably, the liquid carrier is distilled or deionized water.

To reduce the colorant agglomerate size, conventional milling equipment can be used including smearer-type or shear mills, smasher-type or impact mills, or hybrid mills that provide both shearing and impacting activity. Specific mills include ball mills, high-speed disk impeller mills, high-speed impingement mills, three-roll mills, high-speed stone, bead mills, and high-speed disk dispersers. Preferably, a fine media mill may be used in our method.

During the milling process, a reduced agglomerate size results from the colorant agglomerates being forced to flow between adjacent grinding media in the mill. We theorize that during such a process, conventional grinding media, such as stainless steel and zirconium oxide, are physically degraded (e.g., by chipping, rubbing off, eroding, etc.), resulting in contamination and discoloration. We also theorize that during such a process, conventional grinding media, such as glass, chemically react with the colorant dispersion, resulting in an unacceptable pH altering of the dispersion or resulting ink prepared therefrom. The unacceptable pH is typically a dispersion pH increase of greater than about 8.0% and more typically a pH increase of greater than about 13.0% when compared to the pH of the premix (dispersant and colorant mixture prior to grinding).

We unexpectedly discovered that other materials as grinding media avoid or minimize this chemical interaction or physical degradation. Accordingly, materials may be used as the grinding medium in our method, so long as the material, for example, reduces or eliminates contamination of the dispersion, decreases or eliminates discoloration of the ink, yields a larger color gamut for the ink, does not unacceptably alter the pH of the dispersion or ink produced therefrom, or does not adversely impact the dispersion stability. However, the grinding medium must be capable of reducing the agglomerate size to the desired value.

Specifically, we have discovered that plastic materials as grinding media avoid or reduce the conventional chemical interaction or physical degradation. Plastic media such as commercially available polystyrene, polycarbonate, polyester, polyamide, polyurethane, polyacrylic and blends and copolymers prepared therefrom may be the grinding media. Preferably, polystyrene is used as the grinding media.

The grinding media may be of a size or shape sufficient to reduce the colorant agglomerate size. The size of the grinding media depends on several factors, such as the type of mill selected and the shape of the grinding media. The shape of the grinding media could be any shape, such as substantially spherical, cylindrical, or cubical. Preferably, the grinding medium of our invention is polystyrene spheres, such as those commercially available from Norstone, Inc. Moreover, when spheres are employed, they often have a diameter from about 0.3 to about 1.5 mm and preferably from about 0.6 to about 0.9 mm, including all ranges subsumed therein.

The grinding media used herein has sufficient physical and chemical characteristics so that the media does not physically degrade or chemically interact in the milling process. For example, the grinding media has sufficient physical strength (e.g., tensile and impact strength) and sufficient flexibility (e.g., % elongation at break and bulk density) to substantially resist the stress and strains of the milling process. As another example, the grinding media is composed of compounds or substances that do not substantially chemically react in any measurable manner with the colorant dispersion.

Because it does not substantially chemically interact in the milling process, the grinding media unexpectedly does not alter the pH of the original premix (dispersant and pigment prior to grinding) by more than about ±7.0% and preferably by no more than about 5.0%. Therefore, the grinding media does not raise or lower the pH of the dispersion above a level that would render an ink prepared therefrom incompatible with, for instance, ink jet printing equipment.

Because the grinding media of this invention does not physically degrade during the milling process, the grinding media reduces or eliminates contamination of the dispersion as determined by visual inspection and comparison of inks prepared from this invention and inks prepared with conventional media. The contamination caused by conventional grinding media both discolored the ink and resulted in visually observable sedimentation in a short period of time. Accordingly, the grinding media of this invention reduces or eliminates this discoloration and premature sedimentation. Moreover, the instant invention unexpectedly minimizes pH altering of the original premix pH while simultaneously reducing sedimentation in the dispersion and inks prepared therefrom.

The colorant (insoluble dye or pigment) dispersion is combined with additional ingredients to form an ink. The additional ingredients should, when combined with the pigment dispersion, yield an ink composition having optimum application and performance properties. Accordingly, any ink ingredient, or combination of ingredients, may be added depending on the optimum application and performance property desired. By way of example, the following ingredients may be added to the colorant dispersion to form an ink: 1,3-propanediol, PEG 400, Lexmark™ acrylic terpolymer (prepared from the monomers: methacrylic acid, stearyl methacrylate, polydimethylsiloxane), and deionized water.

Other additives may be added to the ink. These additives include, for example, driers, waxes, antioxidants, and miscellaneous additives such as lubricants, surface-energy modifying agents, thickeners, gellants, defoamers, wetting agents, biocides, chelators, shorteners and anti-curling agents.

One of the important properties of an ink is the color. Color may be interpreted by, for example, characteristics referred to as $L^*$, $a^*$ and $b^*$ values. The color gamut, or range of colors obtainable by an ink, depends on the area of a graph obtained from these values. The greater the area, the greater the gamut/range of colors an ink may obtain. Grinding media used in our ink manufacture, again, unexpectedly improves the ink's color gamut, when compared to inks made via conventional grinding media, by at least about 10% and preferably by at least about 15% and most preferably by at least about 20%.

Our method is illustrated by the following Examples, which should not be interpreted as limiting the scope of our invention in any manner.

EXAMPLE 1

| | |
|---|---|
| PIGMENT | PIGMENT YELLOW 74 |
| MEDIA | BOROSILICATE GLASS |
| PIGMENT: DISPERSANT RATIO | 3.25:1.0 |
| SOLIDS | 30% |
| MILL SPEED | 5000 RPM |
| MILL TIME | 4 HOURS |
| INITIAL pH | 7.53 |
| FINAL pH | 9.66 |
| APPEARANCE | MUDDY YELLOW |

EXAMPLE 2

| | |
|---|---|
| PIGMENT | PIGMENT YELLOW 74 |
| MEDIA | YTZ (yttrium treated zirconia) |
| PIGMENT: DISPERSANT RATIO | 2.0:1.0–4.0:1.0 |
| SOLIDS | 20–30% |
| MILL SPEED | 2000–5000 RPM |
| MILL TIME | 4 HOURS |
| FINAL pH | 7.2–7.6 |
| APPEARANCE | GREENISH YELLOW WITH PRECIPITATE |

EXAMPLE 3

| | |
|---|---|
| PIGMENT | PIGMENT YELLOW 74 |
| MEDIA | POLYSTYRENE |
| PIGMENT: DISPERSANT RATIO | 1.0:1.0–4.0:1.0 |
| SOLIDS | 20–30% |
| MILL TIME | 4 HOURS |
| MILL SPEED | 3500 RPM |
| APPEARANCE | BRIGHT YELLOW; NO PRECIPITATE |

EXAMPLE 4

| | |
|---|---|
| PIGMENT | PIGMENT BLUE 15:4 |
| MEDIA | BOROSILICATE GLASS |
| PIGMENT: DISPERSANT RATIO | 2.5:1.0 |
| % SOLIDS | 25% |
| MILL SPEED | 5000 RPM |
| MILL TIME | 4 HOURS |
| INITIAL pH | 7.62 |
| FINAL pH | 9.84 |

-continued

EXAMPLE 5

| | |
|---|---|
| PIGMENT | PIGMENT BLUE 15:4 |
| MEDIA | YTZ |
| PIGMENT: DISPERSANT RATIO | 4.0:1.0–1.0:1.0 |
| MILL SPEED | 2000–5000 RPM |
| SOLIDS | 20–30% |
| MILL TIME | 4 HOURS |

EXAMPLE 6

| | |
|---|---|
| PIGMENT | PIGMENT BLUE 15:4 |
| MEDIA | POLYSTYRENE |
| PIGMENT: DISPERSANT RATIO | 2.5:1.0 |
| SOLIDS | 25% |
| MILL TIME | 4 HOURS |
| MILL SPEED | 5000 RPM |
| AVERAGE INITIAL pH | 7.85 |
| AVERAGE FINAL pH | 8.37 |

EXAMPLE 7

| | |
|---|---|
| PIGMENT | PIGMENT RED 122 |
| MEDIA | YTZ |
| PIGMENT: DISPERSANT RATIO | 4.0:1.0 |
| SOLIDS | 30% |
| MILL TIME | 4 HOURS |
| MILL SPEED | 5000 RPM |
| INITIAL pH | 8.03 |
| FINAL pH | 8.28 |

EXAMPLE 8

| | |
|---|---|
| PIGMENT | PIGMENT RED 122 |
| MEDIA | POLYSTYRENE |
| PIGMENT: DISPERSANT RATIO | 4.0:1.0 |
| SOLIDS | 30% |
| MILL TIME | 4 HOURS |
| MILL SPEED | 5000 RMP |
| INITIAL pH | 7.25 |
| FINAL pH | 7.22 |

TABLE 1

| SAMPLE | INK | $L^*$ | $a^*$ | $b^*$ |
|---|---|---|---|---|
| 1 | Example 2 | 91.83 | −11.86 | 81.46 |
| 2 | Example 5 | 47.74 | −3.76 | −51.26 |
| 3 | Example 7 | 61.14 | 48.95 | −10.61 |
| 4[i*] | Examples 2 & 7 | 57.88 | 38.69 | 42.54 |
| 5[i**] | Examples 2 & 5 | 42.50 | −42.82 | 13.80 |
| 6[i***] | Examples 5 & 7 | 33.73 | 16.30 | 40.73 |
| 7 | Example 3 | 91.36 | −11.75 | 91.67 |
| 8 | Example 6 | 48.68 | −5.54 | −51.76 |
| 9 | Example 8 | 57.57 | 59.64 | −10.84 |
| 10[i*] | Examples 3 & 8 | 54.81 | 50.30 | 47.02 |
| 11[i**] | Examples 3 & 6 | 42.30 | −47.27 | 20.33 |
| 12[i***] | Examples 6 & 8 | 29.11 | 21.37 | −42.99 |

[i]a 50:50 mixture of the inks, corresponding to the Examples, was made via subtractive color mixing by printing one color on top of the other.
[i*]red, [i]green, [i*]blue Mono-chamber ink jet print cartridges were loaded with the inks prepared in Examples 2, 5, 7, (control) 3, 6 and 8 (inks prepared with a polystyrene media). A commercially available wide format ink jet printer was to print color squares (Area 9 cm$^2$). $L^*$, $a^*$ and $b^*$ values of each square measured using a Minolta Spectrophotometer (CM-2002). The $a^*$ and $b^*$ coordinates were plotted. The areas of the resulting graphs (control vs. polystyrene) were compared. The area of the graph for the inks prepared with polystyrene as a grinding media was approximately 30.0% greater than the area of the graph for the inks prepared with YTZ as a grinding media. This unexpectedly indicates an improved gamut of about 30.0%.

We claim:

1. A method for making a dispersion for an ink, comprising the steps of:
   a) mixing a dispersant and colorant having an initial size to form a premix; and
   b) reducing the initial size of the colorant using a plastic medium to produce at least one member selected from the group consisting of colorant aggregates and colorant particles, wherein said dispersant is a co-polymer which is the polymerization product of at least one member selected from the group consisting of acrylates and methacrylates, and at least one member selected from the group consisting of acryloyl- and methacryloyl-terminated polydialkylsiloxanes, and at least one member selected from the group consisting of stearyl acrylate, stearyl methacrylate and lauryl methacrylate.

2. The method according to claim 1, wherein the dispersion is made by dispersing the colorant in the dispersant.

3. The method according to claim 2, further comprising the step of adding a liquid carrier to the dispersion.

4. The method according to claim 3, wherein said liquid carrier is distilled or deionized water, toluene, isopropyl alcohol, soybean oil, rapeseed oil, tung oil, mineral oil, or mixtures thereof.

5. The method according to claim 1, wherein the colorant is a pigment, and said pigment is carbon black or a yellow, cyan, magenta, red, green or orange pigment.

6. The method according to claim 1, wherein the plastic medium is a grinding medium.

7. The method according to claim 6 wherein said grinding medium has a bulk density of less than about 1.45 kg/l.

8. The method according to claim 6, wherein the grinding medium is a polystyrene, polycarbonate, polyamide, polyurethane, polyacrylic, or copolymer or blend prepared therefrom.

9. The method according to claim 8, wherein the grinding medium is polystyrene.

10. The method according to claim 1, wherein the plastic is spherical, cylindrical or cubical.

11. The method according to claim 1, wherein the colorant is a pigment agglomerate.

12. The method according to claim 1 wherein the initial size of the colorant is reduced in a fine media mill.

13. The method according to claim 1 wherein the dispersion does not have a pH which is altered by greater than about ±7.0% when compared to the pH of the premix.

14. A dispersion made by a method comprising the steps of:
   a) mixing a dispersant and colorant having an initial size to form a premix; and
   b) reducing the initial size of the colorant using a plastic medium to produce at least one member selected from the group consisting of colorant aggregates and colorant particles.

wherein said dispersant is a co-polymer which is the polymerization product of at least one member selected from the group consisting of acrylates and methacrylates, and at least one member selected from the group consisting of acryloyl- and methacryloyl-terminated polydialkylsiloxanes, and at least one member selected from the group consisting of stearyl acrylate stearyl methacrylate and lauryl methacrylate.

15. An ink jet ink composition comprising a dispersion made by a method comprising the steps of:

a) mixing a dispersant and colorant having an initial size to form a premix; and b) reducing the initial size of the colorant using a plastic medium to produce at least one member selected from the group consisting of colorant aggregates and colorant particles, wherein said dispersant is a co-polymer which is the polymerization product of at least one member selected from the group consisting of acrylates and methacrylates, and at least one member selected from the group consisting of acryloyl- and methacryloyl-terminated polydialkylsiloxanes, and at least one member selected from the group consisting of stearyl acrylate, stearyl methacrylate and lauryl methacrylate.

* * * * *